(12) United States Patent
Idaka

(10) Patent No.: US 9,407,808 B2
(45) Date of Patent: Aug. 2, 2016

(54) IMAGING APPARATUS, EXTERNAL APPARATUS, IMAGING SYSTEM, METHOD FOR CONTROLLING IMAGING APPARATUS, METHOD FOR CONTROLLING EXTERNAL APPARATUS, METHOD FOR CONTROLLING IMAGING SYSTEM, AND STORAGE MEDIUM

(71) Applicant: CANON KABUSHIKI KAISHA, Tokyo (JP)

(72) Inventor: Yujiro Idaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/333,319

(22) Filed: Jul. 16, 2014

(65) Prior Publication Data

US 2015/0022680 A1    Jan. 22, 2015

(30) Foreign Application Priority Data

Jul. 20, 2013 (JP) ................. 2013-151173

(51) Int. Cl.
*H04N 5/225* (2006.01)
*H04N 5/232* (2006.01)
*H04N 5/262* (2006.01)

(52) U.S. Cl.
CPC ....... *H04N 5/23206* (2013.01); *H04N 5/23216* (2013.01); *H04N 5/23296* (2013.01); *H04N 5/2628* (2013.01)

(58) Field of Classification Search
CPC .......... H04N 5/23206; H04N 5/23296; H04N 5/23216; H04N 5/2628
USPC ........ 348/207.1, 207.11, 211.1, 211.2, 211.4, 348/552
See application file for complete search history.

(56) References Cited

U.S. PATENT DOCUMENTS 5,842,053 A * 11/1998 Ueyama ............... G02B 27/646
348/208.11
2012/0231818 A1* 9/2012 Takami et al. ............. 455/456.3

FOREIGN PATENT DOCUMENTS

JP          P2003-8973 A     1/2003

* cited by examiner

*Primary Examiner* — Yogesh Aggarwal
(74) *Attorney, Agent, or Firm* — Canon U.S.A., Inc., IP Division

(57) ABSTRACT

An imaging apparatus includes an imaging unit configured to capture an object image, a rotation unit configured to rotate the imaging unit in a predetermined direction, and a first transmission unit configured to transmit, to an external apparatus, acceleration information indicating whether an acceleration at which the rotation unit rotates the imaging unit is able to be designated.

16 Claims, 13 Drawing Sheets

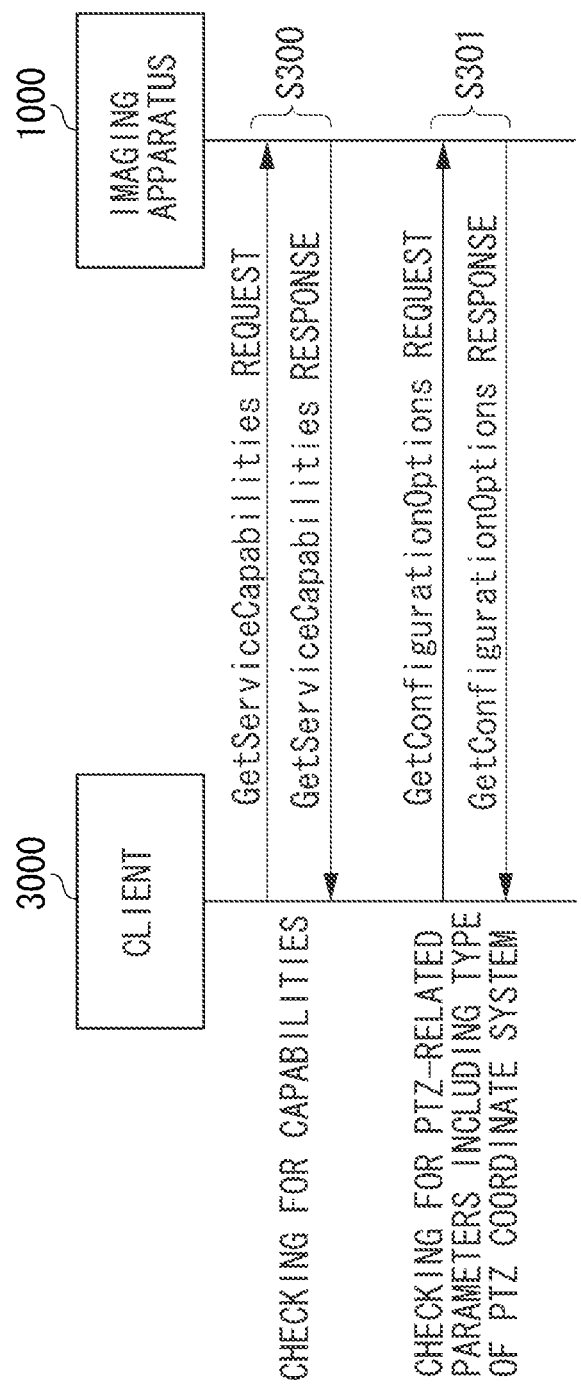

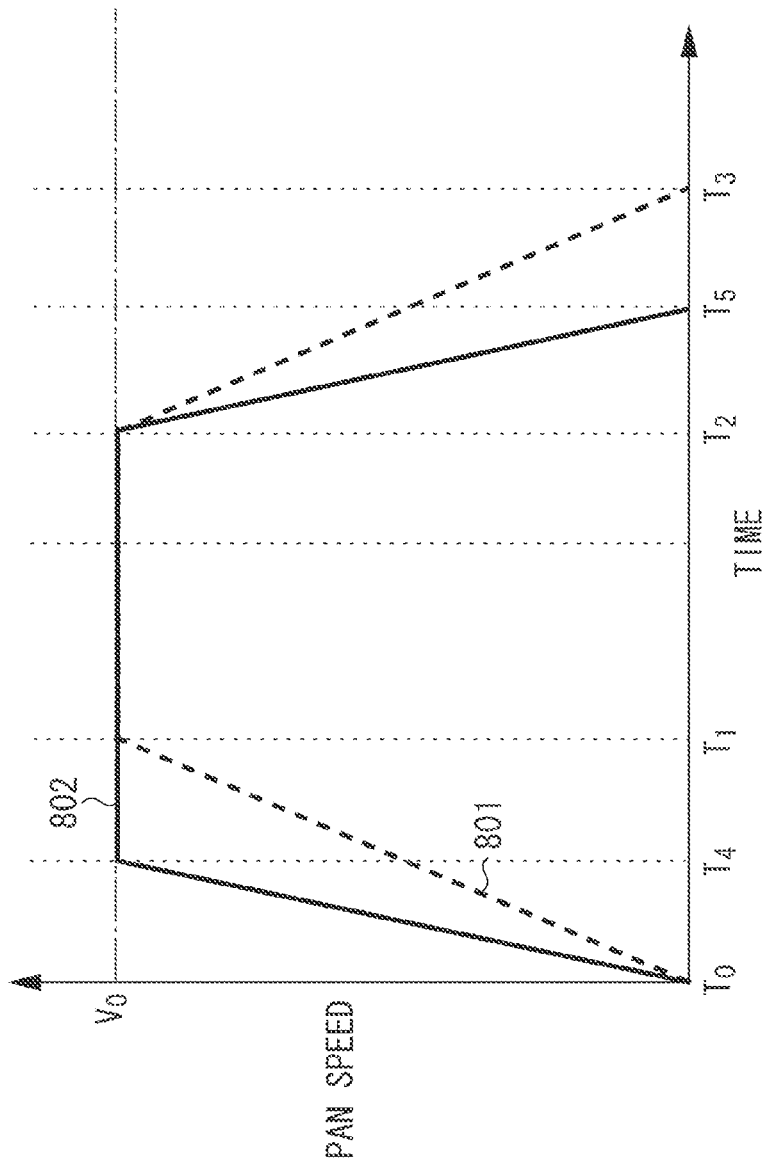

FIG. 9

| NORMALIZED ACCELERATION | ACTUAL ACCELERATION m/s² |
|---|---|
| 0.1 | 0.18 |
| 0.5 | 0.9 |
| 1 | 1.8 |

FIG. 10

```
GetConfigurationOptions REQUEST
    <s:Header/>
    <s:Body xmlns:xsi="http://www.w3.org/2001/XMLSchema-instance" xmlns:xsd="http://www.w3.org/2001/XMLSchema">
        <GetConfigurationOptions xmlns="http://www.onvif.org/ver20/ptz/wsdl">
            <ConfigurationToken>0</ConfigurationToken>
        </GetConfigurationOptions>
    </s:Body>
```

FIG. 11

```
GetConfigurationOptions RESPONSE
<s:Body>
    <tptz1:GetConfigurationOptionsResponse>
        <tptz1:PTZConfigurationOptions>
            <tptz2:Spaces>
                <tptz2:AbsolutePanTiltPositionSpace>
                    <tptz2:URI>http://www.onvif.org/ver10/tptz/PanTiltSpaces/PositionGenericSpace</tptz2:URI>
                    <tptz2:XRange>
                        <tptz2:Min>-1.000000</tptz2:Min>
                        <tptz2:Max>1.000000</tptz2:Max>
                    </tptz2:XRange>
                    <tptz2:YRange>
                        <tptz2:Min>-1.000000</tptz2:Min>
                        <tptz2:Max>1.000000</tptz2:Max>
                    </tptz2:YRange>
                </tptz2:AbsolutePanTiltPositionSpace>
                <tptz2:AbsoluteZoomPositionSpace>
                    <tptz2:URI>http://www.onvif.org/ver10/tptz/ZoomSpaces/PositionGenericSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:AbsoluteZoomPositionSpace>
                <tptz2:PanTiltSpeedSpace>
                    <tptz2:URI>http://www.onvif.org/ver10/tptz/PanTiltSpaces/GenericSpeedSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:PanTiltSpeedSpace>
                <tptz2:ZoomSpeedSpace>
                    <tptz2:URI>http://www.onvif.org/ver10/tptz/ZoomSpaces/ZoomGenericSpeedSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:ZoomSpeedSpace>
                <tptz2:PanTiltAccelarationSpace>
                    <tptz2:URI>http://www.onvif.org/ver10/tptz/PanTiltSpaces/GenericAccelarationSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:PanTiltAccelarationSpace>
                <tptz2:ZoomAccelarationSpace>
                    <tptz2:URI>http://www.onvif.org/ver10/tptz/ZoomSpaces/ZoomGenericSpeedSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:ZoomAccelarationSpace>
            </tptz2:Spaces>
            <tptz2:PTZTimeout>
                <tptz2:Min>PT1S</tptz2:Min>
                <tptz2:Max>PT04M32S</tptz2:Max>
            </tptz2:PTZTimeout>
            <tptz2:PTControlDirection>
                <tptz2:Reverse>
                    <tptz2:Mode>OFF</tptz2:Mode>
                    <tptz2:Mode>ON</tptz2:Mode>
                </tptz2:Reverse>
            </tptz2:PTControlDirection>
        </tptz1:PTZConfigurationOptions>
    </tptz1:GetConfigurationOptionsResponse>
</s:Body>
```

FIG. 12

SetConfiguration REQUEST

```xml
<s:Body xmlns:xsi="http://www.w3.org/2001/XMLSchema-instance" xmlns:xsd="http://www.w3.org/2001/XMLSchema">
  <SetConfiguration xmlns="http://www.onvif.org/ver20/ptz/wsdl">
    <PTZConfiguration token="0">
      <Name xmlns="http://www.onvif.org/ver10/schema">ptz</Name>
      <UseCount xmlns="http://www.onvif.org/ver10/schema">1</UseCount>
      <NodeToken xmlns="http://www.onvif.org/ver10/schema">0</NodeToken>
      <DefaultAbsolutePanTiltPositionSpace xmlns="http://www.onvif.org/ver10/schema">http://www.onvif.org/ver10/tptz/PanTiltSpaces/PositionGenericSpace</DefaultAbsolutePanTiltPositionSpace>
      <DefaultAbsoluteZoomPositionSpace xmlns="http://www.onvif.org/ver10/schema">http://www.onvif.org/ver10/tptz/ZoomSpaces/PositionGenericSpace</DefaultAbsoluteZoomPositionSpace>
      <DefaultRelativePanTiltTranslationSpace xmlns="http://www.onvif.org/ver10/schema">http://www.onvif.org/ver10/tptz/PanTiltSpaces/TranslationGenericSpace</DefaultRelativePanTiltTranslationSpace>
      <DefaultRelativeZoomTranslationSpace xmlns="http://www.onvif.org/ver10/schema">http://www.onvif.org/ver10/tptz/ZoomSpaces/TranslationGenericSpace</DefaultRelativeZoomTranslationSpace>
      <DefaultContinuousPanTiltVelocitySpace xmlns="http://www.onvif.org/ver10/schema">http://www.onvif.org/ver10/tptz/PanTiltSpaces/VelocityGenericSpace</DefaultContinuousPanTiltVelocitySpace>
      <DefaultContinuousZoomVelocitySpace xmlns="http://www.onvif.org/ver10/schema">http://www.onvif.org/ver10/tptz/ZoomSpaces/VelocityGenericSpace</DefaultContinuousZoomVelocitySpace>
      <DefaultPTZSpeed xmlns="http://www.onvif.org/ver10/schema">
        <PanTilt x="1" y="1" space="http://www.onvif.org/ver10/tptz/PanTiltSpaces/GenericSpeedSpace" />
        <Zoom x="1" space="http://www.onvif.org/ver10/tptz/ZoomSpaces/ZoomGenericSpeedSpace" />
      </DefaultPTZSpeed>
      <DefaultPTZAcceleration xmlns="http://www.onvif.org/ver10/schema">
        <PanTilt x="1" y="1" space="http://www.onvif.org/ver10/tptz/PanTiltSpaces/GenericAccelerationSpace" />
        <Zoom x="1" space="http://www.onvif.org/ver10/tptz/ZoomSpaces/ZoomGenericAccelerationSpace" />
      </DefaultPTZAcceleration>
      <DefaultPTZTimeout xmlns="http://www.onvif.org/ver10/schema">PT8S</DefaultPTZTimeout>
      <Extension xmlns="http://www.onvif.org/ver10/schema">
        <PTControlDirection>
          <Reverse>
            <Mode>OFF</Mode>
          </Reverse>
        </PTControlDirection>
      </Extension>
    </PTZConfiguration>
    <ForcePersistence>false</ForcePersistence>
  </SetConfiguration>
</s:Body>
```

FIG. 13

SetConfiguration RESPONSE

```
<SOAP-ENV:Body>
  <tptz1:SetConfigurationResponse>
  </tptz1:SetConfigurationResponse>
</SOAP-ENV:Body>
```

IMAGING APPARATUS, EXTERNAL APPARATUS, IMAGING SYSTEM, METHOD FOR CONTROLLING IMAGING APPARATUS, METHOD FOR CONTROLLING EXTERNAL APPARATUS, METHOD FOR CONTROLLING IMAGING SYSTEM, AND STORAGE MEDIUM

BACKGROUND

1. Field

The present application relates to an imaging apparatus, an external apparatus, an imaging system, a method for controlling an imaging apparatus, a method for controlling an external apparatus, a method for controlling an imaging system, and a storage medium. In particular, the discussed subject matter may relate to cases where an imaging unit configured to capture an object image is able to be rotated in predetermined directions.

2. Description of Related Art

There are known conventional imaging apparatuses capable of changing a shooting direction by moving a pan tilt head. Also, there are known imaging apparatuses capable of changing a shooting direction according to an instruction transmitted from an external apparatus connected to the imaging apparatus via a network.

Japanese Patent Laid-Open Application No. 2003-8973 discusses an imaging apparatus capable of changing a shooting direction by moving a pan tilt head in response to a key operation on a mobile phone having a browser function or a mouse operation on a personal computer.

Such imaging apparatuses are used for various purposes such as monitoring and video conferences. Imaging apparatuses respectively equipped with various types of pan tilt heads are available on the market. For example, there is available a pan tilt zoom (PTZ) camera, which is capable of rotating an imaging unit, configured to capture an object image, in pan directions and tilt directions and which is capable of changing the zoom position of the imaging unit.

However, the above-mentioned PTZ camera is not configured in consideration of a "speed" or "acceleration" at which to rotate the imaging unit in pan directions or tilt directions specified by an external apparatus.

Suppose that there is available a PTZ camera in which the "speed" or "acceleration" is able to be specified by an external apparatus. This supposition thus could allow a mix of PTZ cameras on the market in which the "speed" is able to be specified by an external apparatus and PTZ cameras in which the "speed" and the "acceleration" are able to be specified by an external apparatus.

Therefore, a user who operates an external apparatus capable of communicating with a PTZ camera via a network is unlikely to readily know whether the PTZ camera, capable of communicating with the external apparatus via the network, allows the "speed" to be specified by the external apparatus or allows the "acceleration" to be specified by the external apparatus.

SUMMARY

The instant application is directed to enabling a user to readily know whether an acceleration at which to rotate an imaging unit, which is configured to capture an object image, in a predetermined direction is able to be specified.

According to an aspect of the present application, an imaging apparatus includes an imaging unit configured to capture an object image, a rotation unit configured to rotate the imaging unit in a predetermined direction, and a first transmission unit configured to transmit, to an external apparatus, acceleration information indicating whether an acceleration at which the rotation unit rotates the imaging unit is able to be designated.

According to another aspect, an external apparatus capable of communicating with an imaging apparatus including an imaging unit configured to capture an object image and a rotation unit configured to rotate the imaging unit in a predetermined direction includes an acquisition unit configured to acquire, from the imaging apparatus, acceleration information indicating whether an acceleration at which the rotation unit rotates the imaging unit is able to be designated, and a changing unit configured to change contents to be displayed on a display unit, in accordance with the acceleration information received from the imaging apparatus.

According to yet another aspect, an imaging system includes an imaging apparatus, and an external apparatus capable of communicating with the imaging apparatus, wherein the imaging apparatus comprises an imaging unit configured to capture an object image, and a rotation unit configured to rotate the imaging unit in a predetermined direction, and wherein the external apparatus comprises an acquisition unit configured to acquire, from the imaging apparatus, acceleration information indicating whether an acceleration at which the rotation unit rotates the imaging unit is able to be designated.

According to yet another aspect, a method for controlling an imaging apparatus comprising an imaging unit configured to capture an object image and a rotation unit configured to rotate the imaging unit in a predetermined direction includes transmitting, to an external apparatus, acceleration information indicating whether an acceleration at which the rotation unit rotates the imaging unit is able to be designated, and controlling the acceleration according to an instruction from the external apparatus.

According to yet another aspect, a non-transitory computer-readable storage medium stores computer-executable process steps, the computer-executable process steps causing a computer to execute a method for controlling an imaging apparatus comprising an imaging unit configured to capture an object image and a rotation unit configured to rotate the imaging unit in a predetermined direction, the method including transmitting, to an external apparatus, acceleration information indicating whether an acceleration at which the rotation unit rotates the imaging unit is able to be designated, and controlling the acceleration according to an instruction from the external apparatus.

Further features of the present application will become apparent from the following description of exemplary embodiments with reference to the attached drawings.

BRIEF DESCRIPTION OF THE DRAWINGS

FIG. 3 illustrates a command sequence between the client and the imaging apparatus according to the first exemplary embodiment.

FIG. 8 illustrates an example of a change of the "speed" at which to change a shooting direction of the imaging apparatus according to the first exemplary embodiment.

FIG. 9 illustrates an example of a correspondence relationship between an acceleration included in a SetConfiguration request and an acceleration at which to change a shooting direction of the imaging apparatus according to the first exemplary embodiment.

FIG. 10 illustrates an example of a GetConfigurationOptions request according to the first exemplary embodiment.

FIG. 11 illustrates an example of a GetConfigurationOptions response according to the first exemplary embodiment.

FIG. 12 illustrates an example of the SetConfiguration request according to the first exemplary embodiment.

FIG. 13 illustrates an example of a SetConfiguration response according to the first exemplary embodiment.

DETAILED DESCRIPTION

Various exemplary embodiments, features, and aspects of the instant application will be described in detail below with reference to the drawings. The configurations described in the following embodiments are mere examples, and the claimed subject matter should not be construed as being limited to the illustrated configurations.

Figure 1A:
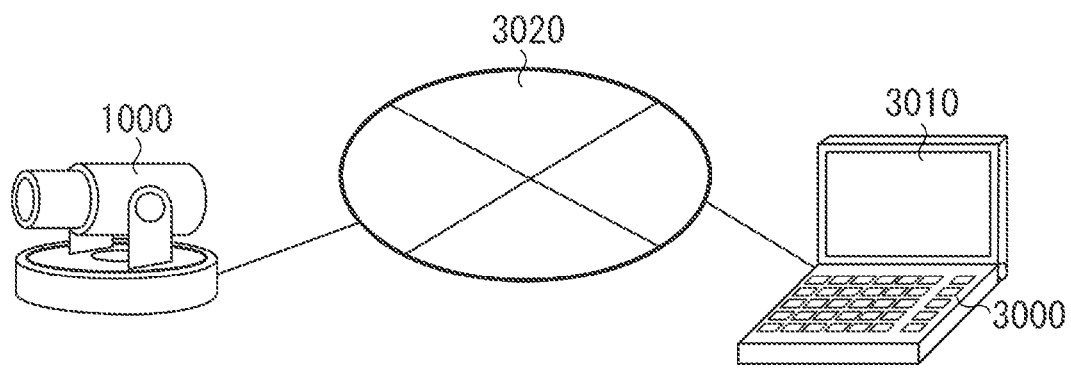
FIGS. 1A and 1B illustrate an example of a system configuration of an imaging system according to a first exemplary embodiment and an example of a driving mechanism used for an imaging apparatus according to the first exemplary embodiment to change a shooting direction or an angle of field, respectively.

FIG. 1A illustrates an example of a system configuration of an imaging system according to a first exemplary embodiment. The imaging system according to the present exemplary embodiment includes an imaging apparatus 1000 and a client 3000, which are connected to each other via a network 3020. Thus, the imaging apparatus 1000 is capable of communicating with the client 3000. The imaging apparatus 1000 can transmit a captured image to the client 3000 via the network 3020.

The client 3000 is an example of an external apparatus. The client 3000 includes a display unit 3010, which is described below with reference to FIG. 2B. In the present exemplary embodiment, the imaging apparatus 1000 is a monitoring camera that captures a moving image, and is, more specifically, a network camera that is used for monitoring. Also, in the present exemplary embodiment, the imaging apparatus 1000 is mounted on a wall surface or a ceiling.

The network 3020 is composed of a plurality of routers, switches, cables, etc., meeting a communication standard, such as Ethernet. In the present exemplary embodiment, the network 3020 may be any configuration regardless of the communication standard, scale, and structure, as long as it is usable for communications between the imaging apparatus 1000 and the client 3000.

For example, the network 3020 may be composed of the Internet, a wired local area network (LAN), a wireless LAN, or a wide area network (WAN). In the present exemplary embodiment, the imaging apparatus 3000 may be compliant with Power over Ethernet (PoE), or may be supplied with power via a LAN cable.

The client 3000 transmits an instruction to the imaging apparatus 1000. For example, the client 3000 transmits an instruction for changing a shooting direction or an angle of field of the imaging apparatus 1000. The imaging apparatus 1000 changes the shooting direction according to the instruction for changing the shooting direction received from the client 3000. Also, the imaging apparatus 1000 changes the angle of field according to the instruction for changing the angle of field received from the client 3000.

Furthermore, the imaging apparatus 1000 receives, from the client 3000, an instruction for specifying a "speed" at which to change the shooting direction. Then, the imaging apparatus 1000 changes the "speed" at which to change the shooting direction according to the received instruction. In addition, the imaging apparatus 1000 receives, from the client 3000, an "acceleration" at which to change the shooting direction. Then, the imaging apparatus 1000 changes the "acceleration" at which to change the shooting direction according to the received instruction.

Figure 1B:
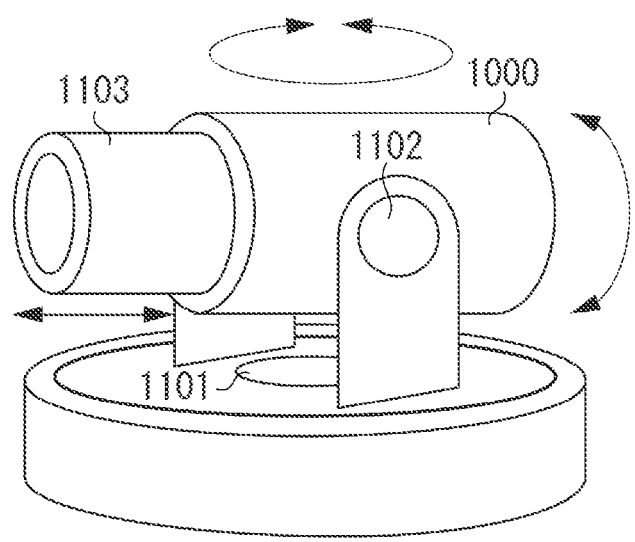

FIG. 1B illustrates an example of a driving mechanism used for the imaging apparatus 1000 to change the shooting direction or the angle of field according to the present exemplary embodiment. A pan driving mechanism 1101 changes the shooting direction of the imaging apparatus 1000 in pan directions. A tilt driving mechanism 1102 changes the shooting direction of the imaging apparatus 1000 in tilt directions. A zoom mechanism 1103 changes the angle of field of the imaging apparatus 1000.

In the present exemplary embodiment, each of the pan driving mechanism 1101, the tilt driving mechanism 1102, and the zoom mechanism 1103 is composed of a stepping motor, gears, etc. Furthermore, in the present exemplary embodiment, each of the pan driving mechanism 1101 and the tilt driving mechanism 1102 corresponds to a rotation unit configured to rotate an imaging unit 1003, which is described below, in a predetermined direction.

Figure 2A:
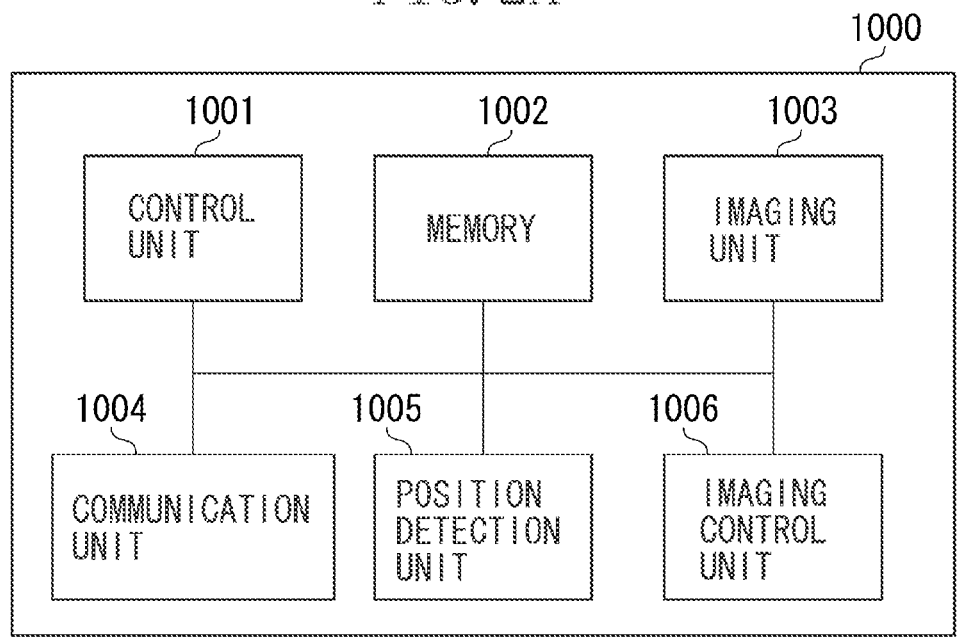
FIGS. 2A and 2B illustrate an example of a hardware configuration of the imaging apparatus according to the first exemplary embodiment and an example of a hardware configuration of a client according to the first exemplary embodiment, respectively.

FIG. 2A illustrates an example of a hardware configuration of the imaging apparatus 1000 according to the present exemplary embodiment. Referring to FIG. 2A, a control unit 1001 controls the entirety of the imaging apparatus 1000. The control unit 1001, which is composed of, for example, a central processing unit (CPU), executes a program stored in a memory 1002, which is described below. Alternatively, the control unit 1001 may perform control using hardware.

The memory 1002 is used as storage regions for data, such as a storage region for programs to be executed by the control unit 1001, a work region used during program execution, and a storage region for a captured image generated by the imaging unit 1003, which is described below. In addition, the memory 1002 stores a coordinate system used for expressing the shooting direction of the imaging apparatus 1000. Moreover, the memory 1002 stores an instruction suspension queue for suspending execution of an instruction received by a communication unit 1004, which is described below.

The imaging unit 1003 converts an analog signal, which has been generated by capturing an object image, into digital data. Furthermore, the imaging unit 1003 generates a captured image by performing data compression processing with adaptive discrete cosine transform or the like, and outputs the captured image to the memory 1002. The imaging unit 1003 transmits an image acquisition event to the control unit 1001 after outputting the captured image to the memory 1002.

The communication unit 1004 receives various control commands from the client 3000. Furthermore, the communication unit 1004 is used to transmit each control command to the client 3000.

A position detection unit 1005 detects respective coordinates of the pan driving mechanism 1101, the tilt driving mechanism 1102, and the zoom mechanism 1103. When a request for information about the shooting direction or the angle of field is transmitted from the client 3000 to the imaging apparatus 1000, the imaging apparatus 1000 detects respective coordinates of the pan driving mechanism 1101, the tilt driving mechanism 1102, and the zoom mechanism 1103, and transmits the detected coordinates to the client 3000.

An imaging control unit 1006 controls the pan driving mechanism 1101, the tilt driving mechanism 1102, and the zoom mechanism 1103 according to an instruction from the control unit 1001. More specifically, when the communication unit 1004 receives an instruction for changing a shooting range from the client 3000, a receive event corresponding to the received instruction is transmitted to the control unit 1001.

When receiving the receive event, the control unit 1001 transmits a control instruction to the imaging control unit 1006 according to the content of the receive event. The imaging control unit 1006, having received the control instruction, performs control to drive the pan driving mechanism 1101, the tilt driving mechanism 1102, and the zoom mechanism 1103 according to the control instruction.

While the internal configuration of the imaging apparatus 1000 has been described above, the processing blocks illustrated in FIG. 2A represent an example of the imaging apparatus 1000 according to the present exemplary embodiment, and are, therefore, not restrictive. The imaging apparatus 1000 may be modified or changed within the scope of the present application, such that, for example, the imaging apparatus 1000 may be equipped with a speech input unit.

Figure 2B:
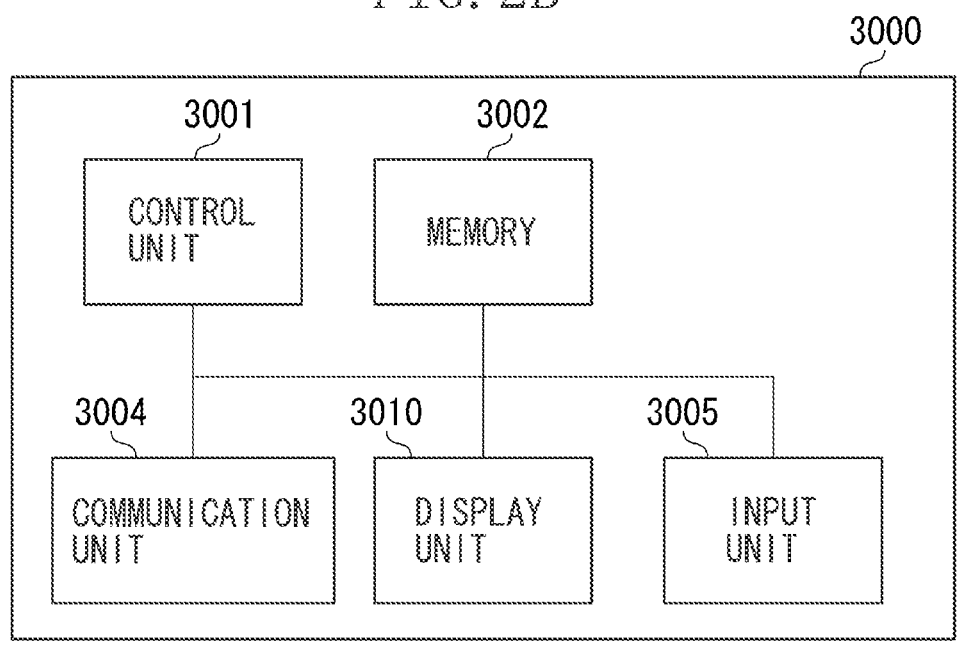

FIG. 2B illustrates an example of a hardware configuration of the client 3000 according to the present exemplary embodiment. The client 3000 according to the present exemplary embodiment is configured as a computer apparatus connected to the network 3020.

A control unit 3001 controls the entirety of the client 3000. The control unit 3001, which is composed of, for example, a CPU, executes a program stored in a memory 3002, which is described below. Alternatively, the control unit 3001 may perform control using hardware.

The memory 3002 is used as a storage region for programs to be executed by the control unit 3001, a work region used during program execution, and a storage region for data. A communication unit 3004 receives a captured image transmitted from the imaging apparatus 1000. Furthermore, the communication unit 3004 transmits an instruction for controlling the imaging apparatus 1000 or an instruction for requesting information about the imaging apparatus 1000.

An input unit 3005 receives input of an instruction from the user. For example, the input unit 3005 can receive input of instructions for transmitting various commands to the imaging apparatus 1000, as the instruction from the user.

When receiving input of an instruction from the user for transmitting a command to the imaging apparatus 1000, the input unit 3005 notifies the control unit 3001 of input of the command transmission instruction. The control unit 3001 generates a command to be transmitted to the imaging apparatus 1000 according to the instruction input to the input unit 3005, and performs transmission control to transmit the generated command to the imaging apparatus 1000 via the communication unit 3004.

In addition, the input unit 3005 can receive input of a user's response to an inquiry message to the user generated by the control unit 3001 executing a program stored in the memory 3002.

A display unit 3010 displays a captured image received by the communication unit 3004. Moreover, the display unit 3010 can display an inquiry message to the user generated by the control unit 3001 executing a program stored in the memory 3002.

FIG. 3 illustrates a command sequence between the client 3000 and the imaging apparatus 1000 used to inquire whether it is possible to specify an "acceleration" at which to change the shooting direction of the imaging apparatus 1000. With reference to FIG. 3, the following describes a command request, which the client 3000 transmits to the imaging apparatus 1000, and a command response, which the imaging apparatus 1000 transmits to the client 3000 in response to the command request.

Each command request includes information on a destination address indicating the address of the imaging apparatus 1000, which is an object caused to execute a command, and information on a source address indicating the address of the client 3000, which is a source that transmits the command.

On the other hand, each command response includes information on a destination address indicating the address of the client 3000, which is an object to which a result of the command is transmitted as a reply, and information on a source address indicating the address of the imaging apparatus 1000, which is a source that transmits the result. Each command includes the content of the command and information on arguments.

The present exemplary embodiment is described on the supposition that each command request and each command response are defined based on the Open Network Video Interface Forum (ONVIF) standard. In the ONVIF standard, the type definition of data used in each command request and each command response is performed by use of the XML SchemaDefinition language (hereinafter sometimes referred to as the "XSD"). Moreover, each command request and each command response are described using the Extensible Markup Language (XML).

In addition, the imaging apparatus 1000 according to the present exemplary embodiment operates as a network video transmitter (hereinafter sometimes referred to as the "NVT") in the ONVIF standard.

In step S300 illustrated in FIG. 3, the control unit 3001 instructs the communication unit 3004 to transmit a "GetServiceCapabilities request" to the imaging apparatus 1000. The "GetServiceCapabilities request" is a command used to inquire about a function that the imaging apparatus 1000 provides.

Also in step S300, the control unit 1001 in the imaging apparatus 1000, having received the "GetServiceCapabilities request", instructs the communication unit 1004 to transmit a "GetServiceCapabilities response" to the client 3000 in reply. The "GetServiceCapabilities response" is a response used to indicate whether the imaging apparatus 1000 is compatible with capabilities and commands employed in the present exemplary embodiment.

In step S301, the control unit 3001 instructs the communication unit 3004 to transmit a "GetConfigurationOptions request" to the imaging apparatus 1000. The "GetConfigurationOptions request" is a request for inquiring about PTZ-related parameters including the type of a PTZ coordinate system. FIG. 10 illustrates an example of the "GetConfigurationOptions request".

Then, in the imaging apparatus 1000, having received the "GetConfigurationOptions request", the control unit 1001 instructs the communication unit 1004 to transmit a "GetConfigurationOptions response" to the client 3000. The "GetConfigurationOptions response" includes pan relative/absolute coordinate system information, tilt relative/absolute coordinate system information, pan-tilt speed relative/absolute information, and pan-tilt acceleration relative/absolute information.

FIG. 11 illustrates an example of the "GetConfigurationOptions response".

The client 3000 is able to determine whether it is possible to specify an "acceleration" at which to change the shooting direction of the imaging apparatus 1000, based on the "GetConfigurationOptions response" received from the imaging apparatus 1000.

For example, suppose that it is possible to specify the "speed" at which to change the shooting direction of the imaging apparatus 1000 and it is impossible to specify the "acceleration" at which to change the shooting direction of the imaging apparatus 1000. In the case of such a supposition, the "GetConfigurationOptions response" includes a <tptz2:PanTiltSpeedSpace> tag. However, this response does not include a <tptz2:PanTiltAccelarationSpace> tag.

The <tptz2:PanTiltSpeedSpace> tag is associated with a <tptz2:Spaces> tag. In addition, the <tptz2:PanTiltSpeedSpace> tag is associated with data indicating a speed at which to change the shooting direction of the imaging apparatus 1000.

Also, for example, suppose that it is possible to specify the "speed" at which to change the shooting direction of the imaging apparatus 1000 and it is possible to specify the "acceleration" at which to change the shooting direction of the imaging apparatus 1000. In the case of such a supposition, the "GetConfigurationOptions response" includes a <tptz2:PanTiltSpeedSpace> tag and a <tptz2:PanTiltAccelarationSpace> tag.

The <tptz2:PanTiltAccelarationSpace> tag in the present exemplary embodiment corresponds to acceleration information.

Thus, the control unit 3001 determines whether the <tptz2:PanTiltAccelarationSpace> tag is included in the "GetConfigurationOptions response" received from the imaging apparatus 1000.

Then, when determining that the <tptz2:PanTiltAccelarationSpace> tag is included in the "GetConfigurationOptions response", the control unit 3001 determines that it is possible to specify the "acceleration" at which to change the shooting direction of the imaging apparatus 1000. On the other hand, when determining that the <tptz2:PanTiltAccelarationSpace> tag is not included in the "GetConfigurationOptions response", the control unit 3001 determines that it is impossible to specify the "acceleration" at which to change the shooting direction of the imaging apparatus 1000.

Similarly, the control unit 3001 determines whether the <tptz2:PanTiltSpeedSpace> tag is included in the "GetConfigurationOptions response" received from the imaging apparatus 1000.

Then, when determining that the <tptz2:PanTiltSpeedSpace> tag is included in the "GetConfigurationOptions response", the control unit 3001 determines that it is possible to specify the "speed" at which to change the shooting direction of the imaging apparatus 1000. On the other hand, when determining that the <tptz2:PanTiltSpeedSpace> tag is not included in the "GetConfigurationOptions response", the control unit 3001 determines that it is impossible to specify the "speed" at which to change the shooting direction of the imaging apparatus 1000.

Based on such a difference in the "GetConfigurationOptions response", the client 3000 can determine whether it is possible to specify the "acceleration" at which to change the shooting direction of the imaging apparatus 1000.

Similarly, the client 3000 can determine whether it is possible to specify the "acceleration" at which to change the angle of field of the imaging apparatus 1000 based on the "GetConfigurationOptions response" received from the imaging apparatus 1000.

For example, suppose that it is possible to specify the "speed" at which to change the angle of field of the imaging apparatus 1000 and it is impossible to specify the "acceleration" at which to change the angle of field of the imaging apparatus 1000. In the case of such a supposition, the "GetConfigurationOptions response" includes a <tptz2:ZoomSpeedSpace> tag. However, this response does not include a <tptz2:ZoomAccelarationSpace> tag.

The <tptz2:ZoomSpeedSpace> tag is associated with a <tptz2:Spaces> tag. In addition, the <tptz2:ZoomSpeedSpace> tag is associated with data indicating a speed at which to change the angle of field of the imaging apparatus 1000.

Also, for example, suppose that it is possible to specify the "speed" at which to change the angle of field of the imaging apparatus 1000 and it is possible to specify the "acceleration" at which to change the angle of field of the imaging apparatus 1000. In the case of such a supposition, the "GetConfigurationOptions response" includes a <tptz2:ZoomSpeedSpace> tag and a <tptz2:ZoomAccelarationSpace> tag.

Thus, the control unit 3001 determines whether the <tptz2:ZoomSpeedSpace> tag is included in the "GetConfigurationOptions response" received from the imaging apparatus 1000.

Then, when determining that the <tptz2:ZoomSpeedSpace> tag is included in the "GetConfigurationOptions response", the control unit 3001 determines that it is possible to specify the "speed" at which to change the angle of field of the imaging apparatus 1000. On the other hand, when determining that the <tptz2:ZoomSpeedSpace> tag is not included in the "GetConfigurationOptions response", the control unit 3001 determines that it is impossible to specify the "speed" at which to change the angle of field of the imaging apparatus 1000.

Similarly, the control unit 3001 determines whether the <tptz2:ZoomAccelerationSpace> tag is included in the "GetConfigurationOptions response" received from the imaging apparatus 1000.

Then, when determining that the <tptz2:ZoomAccelerationSpace> tag is included in the "GetConfigurationOptions response", the control unit 3001 determines that it is possible to specify the "acceleration" at which to change the angle of field of the imaging apparatus 1000.

On the other hand, when determining that the <tptz2:ZoomAccelerationSpace> tag is not included in the "GetConfigurationOptions response", the control unit 3001 determines that it is impossible to specify the "acceleration" at which to change the angle of field of the imaging apparatus 1000.

Thus, the "GetConfigurationOptions response" in the present exemplary embodiment corresponds to information indicating whether it is possible to separately specify a speed and an acceleration at which to change the shooting direction and the angle of field of the imaging apparatus 1000.

Figure 4:
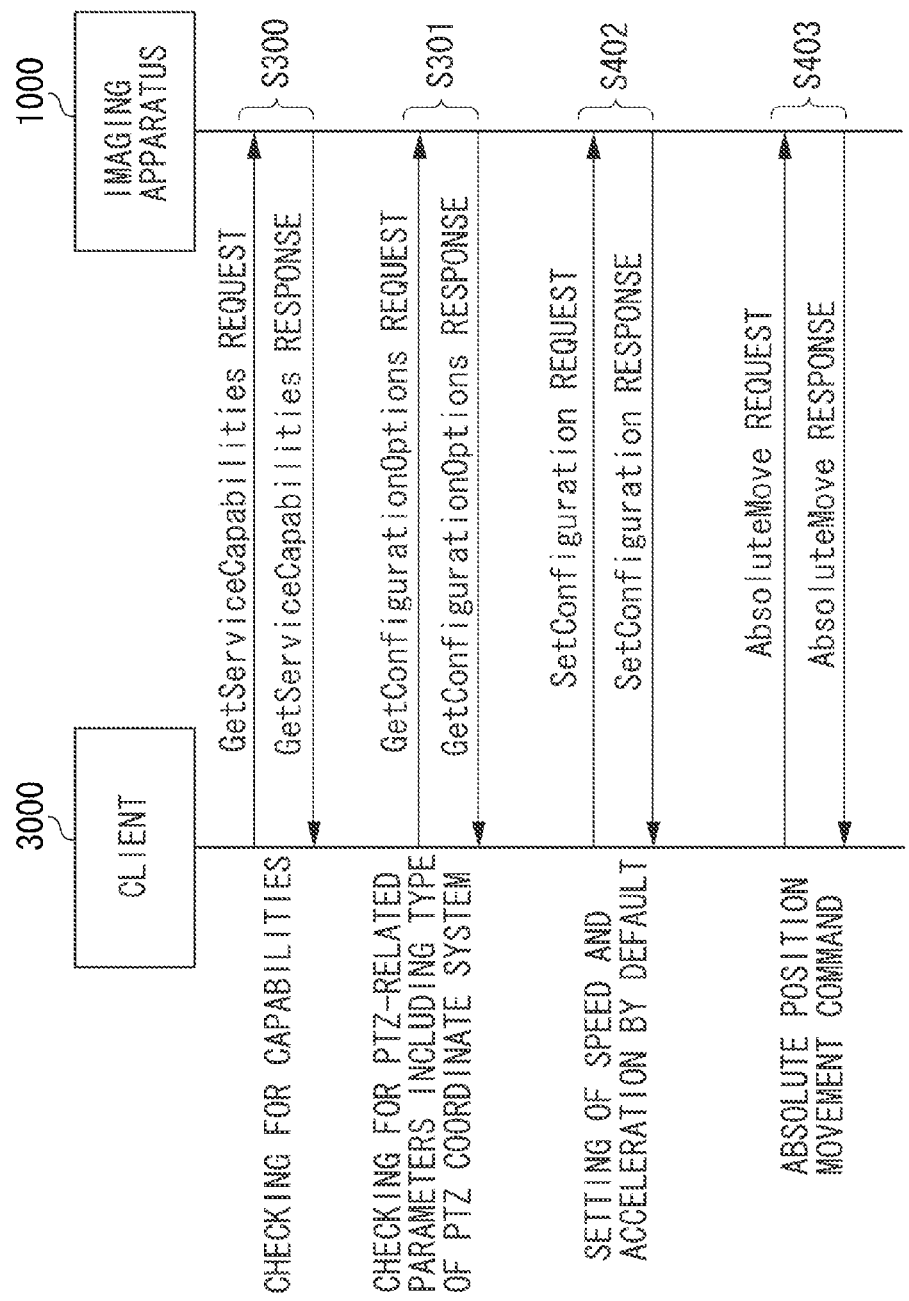
FIG. 4 illustrates another command sequence between the client and the imaging apparatus according to the first exemplary embodiment.

FIG. 4 illustrates an example of a command sequence between the client 3000 and the imaging apparatus 1000 used to specify a "speed" at which to change the shooting direction of the imaging apparatus 1000 and an "acceleration" at which to change the shooting direction of the imaging apparatus 1000. Since step S300 illustrated in FIG. 4 is similar to step S300 illustrated in FIG. 3, the description thereof is not repeated. Also, since step S301 illustrated in FIG. 4 is similar to step S301 illustrated in FIG. 3, the description thereof is not repeated.

In step S402, the control unit 3001 instructs the communication unit 3004 to transmit a "SetConfiguration request" to the imaging apparatus 1000. The "SetConfiguration request" includes, for example, a "speed" at which to change the shooting direction of the imaging apparatus 1000 and an "acceleration" at which to change the shooting direction of the imaging apparatus 1000.

FIG. 12 illustrates an example of the "SetConfiguration request". The "SetConfiguration request" in the present exemplary embodiment corresponds to a control instruction used to control a rotation unit, such as the pan driving mechanism 1101.

In the imaging apparatus 1000, having received the "SetConfiguration request", the control unit 1001 instructs the communication unit 1004 to transmit a "SetConfiguration response" to the client 3000. FIG. 13 illustrates an example of the "SetConfiguration response".

In step S403, the control unit 3001 instructs the communication unit 3004 to transmit, for example, an "AbsoluteMove request" to the imaging apparatus 1000.

In the imaging apparatus 1000, having received the "AbsoluteMove request", the control unit 1001 instructs the communication unit 1004 to transmit an "AbsoluteMove response" to the client 3000 in reply.

The "AbsoluteMove request" is an instruction used to change the shooting direction and the angle of field of the imaging apparatus 1000 by specifying the absolute position in the panning direction and tilt direction and the absolute position in zoom. The "AbsoluteMove response" is a response to the "AbsoluteMove request".

The "GetConfigurationOptions response" in the present exemplary embodiment corresponds to specification information about the "SetConfiguration request" used by the control unit 1001.

Figure 6:
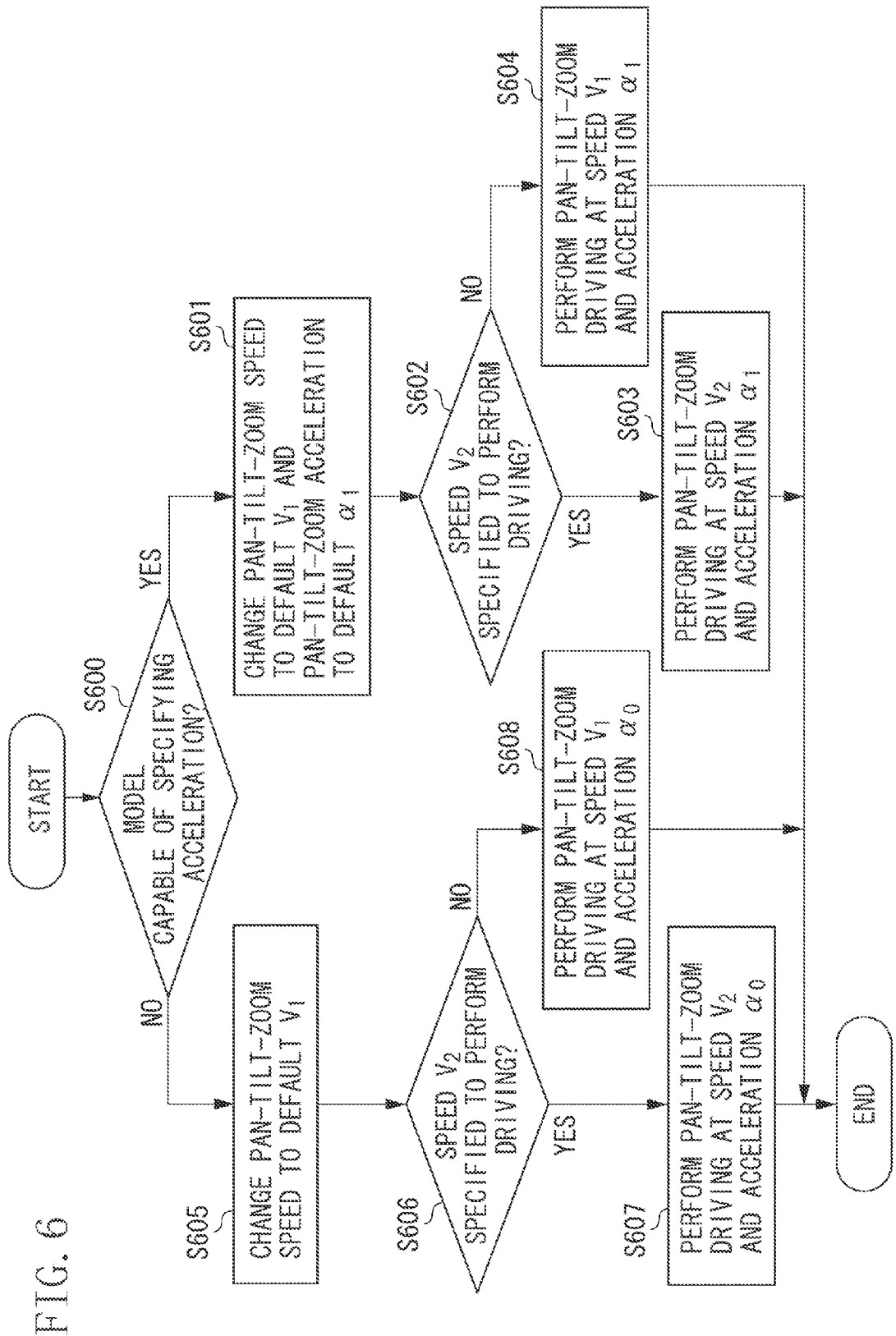
FIG. 6 is a flowchart illustrating processing for changing a shooting direction of the imaging apparatus according to the first exemplary embodiment.

FIG. 6 is a flowchart illustrating an example of processing performed by the client 3000 to control the imaging apparatus 1000 so as to change the shooting direction and the angle of field of the imaging apparatus 1000.

Suppose that the present processing is executed by the control unit 3001. Furthermore, in the present exemplary embodiment, suppose that the default "speed" at which to change the shooting direction and the angle of field of the imaging apparatus 1000 is $V_0$, and the default "acceleration" at which to change the shooting direction and the angle of field of the imaging apparatus 1000 is $\alpha_0$.

Referring to FIG. 6, in step S600, the control unit 3001 determines whether it is possible to specify the "acceleration" at which to change the shooting direction and the angle of field of the imaging apparatus 1000.

If the control unit 3001 determines that it is possible to specify the "acceleration" at which to change the shooting direction and the angle of field of the imaging apparatus 1000 (YES in step S600), the processing proceeds to step S601. On the other hand, if the control unit 3001 determines that it is impossible to specify the "acceleration" at which to change the shooting direction and the angle of field of the imaging apparatus 1000 (NO in step S600), the processing proceeds to step S605.

In step S601, the control unit 3001 instructs the communication unit 3004 to transmit a "SetConfiguration request" to the imaging apparatus 1000. A <DefaultPTZSpeed> tag included in the "SetConfiguration request" is associated with a default "speed" at which to change the shooting direction and the angle of field of the imaging apparatus 1000.

Also, a <DefaultPTZAcceleration> tag included in the "SetConfiguration request" is associated with a default "acceleration" at which to change the shooting direction and the angle of field of the imaging apparatus 1000. More specifically, the default "speed" is $v_1$, and the default "acceleration" is $\alpha_1$.

In the imaging apparatus 1000, having received the "SetConfiguration request" transmitted in step S601, the control unit 1001 changes the "speed" at which to change the shooting direction of the imaging apparatus 1000 to $V_1$. In addition, the control unit 1001 changes the "acceleration" at which to change the angle of field of the imaging apparatus 1000 to $\alpha_1$.

In step S602, the control unit 3001 determines whether the "speed" at which to change the shooting direction and the angle of field of the imaging apparatus 1000 is set by the user.

If the control unit 3001 determines that the "speed" at which to change the shooting direction and the angle of field of the imaging apparatus 1000 is set (YES in step S602), the processing proceeds to step S603. On the other hand, if the control unit 3001 determines that the "speed" at which to change the shooting direction and the angle of field of the imaging apparatus 1000 is not set (NO in step S602), the processing proceeds to step S604.

In step S603, the control unit 3001 instructs the communication unit 3004 to transmit an "AbsoluteMove request" to the imaging apparatus 1000. A <PTZSpeed> tag included in the "AbsoluteMove request" is associated with the speed set in step S602.

The imaging apparatus 1000, having received the "AbsoluteMove request" transmitted in step S603, changes the shooting direction and the angle of field of the imaging apparatus 1000 at the speed set in step S602 and at the default acceleration. More specifically, the set speed is $V_2$, and the default acceleration is $\alpha_1$.

In step S604, the control unit 3001 instructs the communication unit 3004 to transmit an "AbsoluteMove request" to the imaging apparatus 1000. The "AbsoluteMove request" includes no data corresponding to the <PTZSpeed> tag.

The imaging apparatus 1000, having received the "AbsoluteMove request" including no data corresponding to the <PTZSpeed> tag, changes the shooting direction and the angle of field of the imaging apparatus 1000 at the default speed and at the default acceleration. More specifically, the default speed is $V_1$, and the default acceleration is $\alpha_1$.

In step S605, the control unit 3001 instructs the communication unit 3004 to transmit a "SetConfiguration request" to the imaging apparatus 1000. A <DefaultPTZSpeed> tag included in the "SetConfiguration request" is associated with the default "speed" at which to change the shooting direction and the angle of field of the imaging apparatus 1000. The default "speed" is $V_1$.

In step S606, the control unit 3001 determines whether the "speed" at which to change the shooting direction and the angle of field of the imaging apparatus 1000 is set by the user.

If the control unit 3001 determines that the "speed" at which to change the shooting direction and the angle of field of the imaging apparatus 1000 is set (YES in step S606), the processing proceeds to step S607. On the other hand, if the control unit 3001 determines that the "speed" at which to change the shooting direction and the angle of field of the imaging apparatus 1000 is not set (NO in step S606), the processing proceeds to step S608.

In step S607, the control unit 3001 instructs the communication unit 3004 to transmit an "AbsoluteMove request" to the imaging apparatus 1000. A <PTZSpeed> tag included in the "AbsoluteMove request" is associated with the speed set in step S606.

The imaging apparatus 1000, having received the "AbsoluteMove request" transmitted in step S607, changes the shooting direction and the angle of field of the imaging apparatus 1000 at the speed set in step S606 and at the default acceleration. More specifically, the set speed is $V_2$, and the default acceleration is $\alpha_0$.

In step S608, the control unit 3001 instructs the communication unit 3004 to transmit an "AbsoluteMove request" to the imaging apparatus 1000. The "AbsoluteMove request" includes no data corresponding to the <PTZSpeed> tag. The <PTZSpeed> tag is used to specify the "speed" at which to change the shooting direction and the angle of field of the imaging apparatus 1000.

The imaging apparatus 1000, having received the "AbsoluteMove request" including no data corresponding to the <PTZSpeed> tag, changes the shooting direction and the angle of field of the imaging apparatus 1000 at the default speed and at the default acceleration. More specifically, the default speed is $V_1$, and the default acceleration is $\alpha_0$.

Figure 7A:
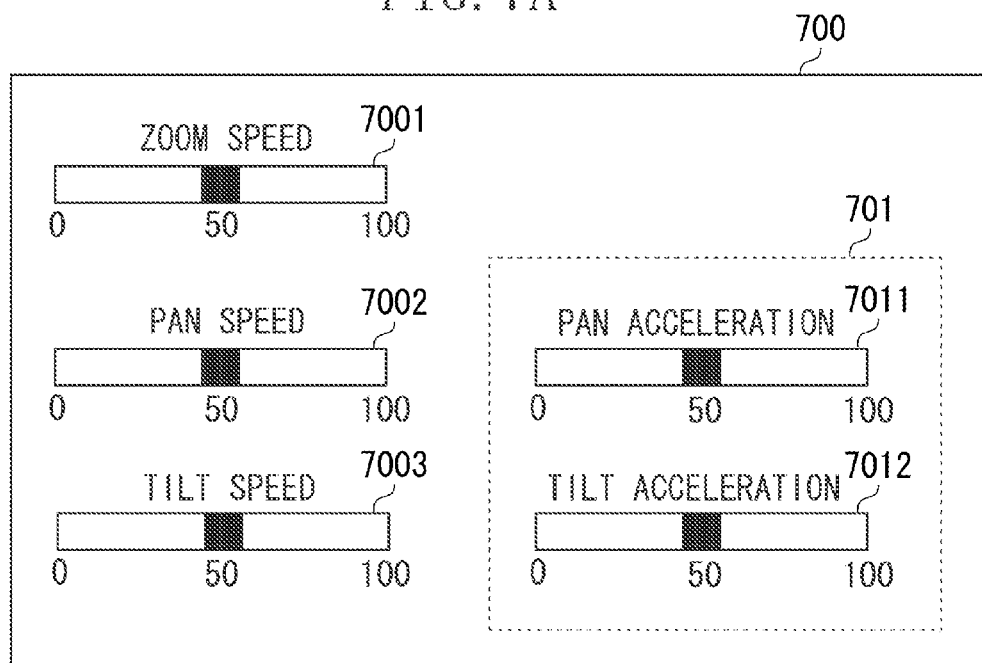
FIGS. 7A and 7B illustrate examples of a setting screen for setting an "acceleration" at which to change a shooting direction of the imaging apparatus according to the first exemplary embodiment.
Figure 7B:
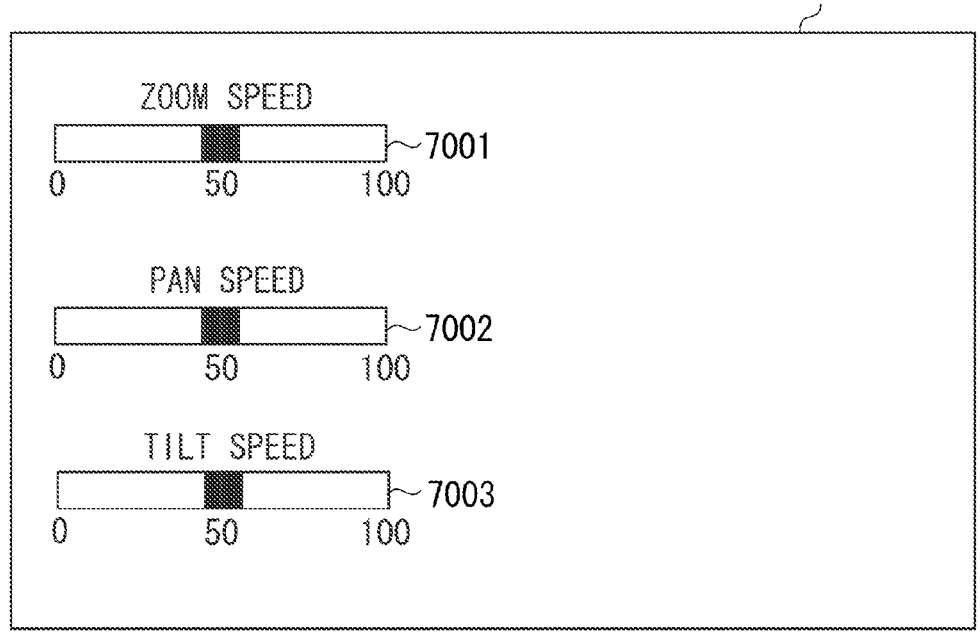

FIGS. 7A and 7B illustrate examples of an input screen (setting screen) for appropriately setting an "acceleration" at which to change the shooting direction of the imaging apparatus 1000 according to the "GetConfigurationOptions response" received from the imaging apparatus 1000.

FIG. 7A illustrates an example of an input screen in a case where a <tptz2:PanTiltAccelarationSpace> tag is included in the "GetConfigurationOptions response" received from the imaging apparatus 1000.

FIG. 7B illustrates an example of an input screen in a case where a <tptz2:ZoomAccelarationSpace> tag is not included in the "GetConfigurationOptions response" received from the imaging apparatus 1000.

More specifically, the control unit 3001 determines whether a <tptz2:PanTiltSpeedSpace> tag and a <tptz2:ZoomSpeedSpace> tag are included in the "GetConfigurationOptions response" received from the imaging apparatus 1000.

Moreover, the control unit 3001 determines whether a <tptz2:PanTiltAccelarationSpace> tag is included in the "GetConfigurationOptions response".

Then, if the control unit 3001 determines that the <tptz2:PanTiltSpeedSpace> tag, the <tptz2:ZoomSpeedSpace> tag, and the <tptz2:PanTiltAccelarationSpace> tag are included in the "GetConfigurationOptions response", the control unit 3001 causes the display unit 3010 to display the input screen illustrated in FIG. 7A.

On the other hand, if the control unit 3001 determines that the <tptz2:PanTiltAccelarationSpace> tag is not included in the "GetConfigurationOptions response" and the <tptz2:PanTiltSpeedSpace> tag and the <tptz2:ZoomSpeedSpace> tag are included in the "GetConfigurationOptions response", the control unit 3001 causes the display unit 3010 to display the input screen illustrated in FIG. 7B.

In a window 700 illustrated in FIG. 7A, a zoom speed input portion 7001, a pan speed input portion 7002, and a tilt speed input portion 7003 are displayed. The zoom speed input portion 7001 is used for the user to input a "speed" at which to change the angle of field of the imaging apparatus 1000. The pan speed input portion 7002 is used for the user to input a "speed" at which to rotate the imaging unit 1003 in a pan direction. The tilt speed input portion 7003 is used for the user to input a "speed" at which to rotate the imaging unit 1003 in a tilt direction.

In a display area 701, a pan acceleration input portion 7011 and a tilt acceleration input portion 7012 are displayed. The pan acceleration input portion 7011 is used for the user to input an "acceleration" at which to rotate the imaging unit 1003 in a pan direction. The tilt acceleration input portion 7012 is used for the user to input an "acceleration" at which to rotate the imaging unit 1003 in a tilt direction.

In a window 700 illustrated in FIG. 7B, the zoom speed input portion 7001, the pan speed input portion 7002, and the tilt speed input portion 7003 are displayed. On the other hand, the pan acceleration input portion 7011 and the tilt acceleration input portion 7012 are not displayed.

While, in FIGS. 7A and 7B, a case where the "acceleration" at which to change the shooting direction of the imaging apparatus 1000 is set is described, a case where the "acceleration" at which to change the angle of field of the imaging apparatus 1000 is set can also apply in a similar way.

FIG. 8 illustrates an example of a change of the speed at which to rotate the imaging unit 1003 in a pan direction. The change of the speed illustrated in FIG. 8 is plotted according to the time when the imaging apparatus 1000, having received the AbsoluteMove command, starts moving the shooting direction of the imaging apparatus 1000 and then stops moving the shooting direction when the shooting direction reaches a predetermined direction.

A broken line 801 illustrated in FIG. 8 indicates a change of the speed at which to rotate the imaging unit 1003 in a pan direction. For example, the broken line 801 indicates a manner in which the speed is increased up to speed $V_0$ at the acceleration $\alpha_0$ during a period from time $T_0$ to time $T_1$. Subsequently, the broken line 801 indicates a manner in which the speed at which to rotate the imaging unit 1003 in the pan direction is kept as speed $V_0$ during a period from time $T_1$ to time $T_2$.

Then, the broken line 801 indicates a manner in which, as the imaging unit 1003 approaches the stop position, the speed at which to rotate the imaging unit 1003 in the pan direction is decreased at the acceleration $-\alpha_0$ during a period from time $T_2$ to time $T_3$, and the speed becomes "0" when the imaging unit 1003 reaches the stop position.

Also, a solid line 802 indicates a change of the speed at which to rotate the imaging unit 1003 in the pan direction. For example, the solid line 802 indicates a manner in which the speed is increased up to speed $V_0$ at the acceleration $\alpha_1$ during a period from time $T_0$ to time $T_4$. The acceleration $\alpha_1$ is greater than the acceleration $\alpha_0$. Subsequently, the solid line 802 indicates a manner in which the speed at which to rotate the imaging unit 1003 in the pan direction is kept as speed $V_0$ during a period from time $T_4$ to time $T_2$.

Then, the solid line 802 indicates a manner in which, as the imaging unit 1003 approaches the stop position, the speed at which to rotate the imaging unit 1003 in the pan direction is decreased at the acceleration $-\alpha_1$ during a period from time $T_2$ to time $T_5$, and the speed becomes "0" when the imaging unit 1003 reaches the stop position.

As illustrated in FIG. 8, the speed indicated by the solid line 802 reaches the speed V0 earlier than the speed indicated by the broken line 801. In addition, with regard to the case of decreasing the speed at which to rotate the imaging unit 1003 in the panning direction, although the speed indicated by the solid line 802 starts decreasing at the same timing as the speed indicated by the broken line 801, the speed indicated by the solid line 802 reaches speed "0" earlier than the speed indicated by the broken line 801.

FIG. 9 illustrates an example of a correspondence relationship between an acceleration included in the "SetConfiguration request" indicated in step S402 and an "acceleration" at which to change the shooting direction of the imaging apparatus 1000. In FIG. 9, the acceleration included in the "SetConfiguration request" is indicated as "normalized acceleration". Also, in FIG. 9, the acceleration at which to change the shooting direction of the imaging apparatus 1000 is indicated as "actual acceleration".

The values of the acceleration included in the "SetConfiguration request" are limited to a range of 0.0 to 1.0 and have no unit. The unit of the acceleration at which to change the shooting direction of the imaging apparatus 1000 is "m/s$^2$".

In the example illustrated in FIG. 9, the imaging apparatus 1000 changes the shooting direction of the imaging apparatus 1000 as follows. For example, in the imaging apparatus 1000 having received the "SetConfiguration request" in which the value of the acceleration is "0.1", the control unit 1001 changes the shooting direction of the imaging apparatus 1000 at an acceleration of "0.18 m/s$^2$".

Furthermore, for example, in the imaging apparatus 1000 having received the "SetConfiguration request" in which the value of the acceleration is "0.5", the control unit 1001 changes the shooting direction of the imaging apparatus 1000 at an acceleration of "0.9 m/s$^2$". Also, for example, in the imaging apparatus 1000 having received the "SetConfiguration request" in which the value of the acceleration is "1", the control unit 1001 changes the shooting direction of the imaging apparatus 1000 at an acceleration of "1.8 m/s$^2$".

The table illustrated in FIG. 9 is stored in the memory 1002.

FIG. 10 illustrates an example of the GetConfigurationOptions request. Referring to FIG. 10, a <ConfigurationToken> tag is associated with a <GetConfigurationOptions> tag. Also, referring to FIG. 10, "0" is associated with the <ConfigurationToken> tag.

An identifier for identifying a plurality of parameters related to the shooting direction and the angle of field of the imaging apparatus 1000 is associated with the <ConfigurationToken> tag.

FIG. 11 illustrates an example of the GetConfigurationOptions response. Referring to FIG. 11, a <tptz1:PTZConfigurationOptions> tag is associated with the GetConfigurationOptions response.

A <tptz2:Spaces> tag, a <tptz2:PTZTimeout> tag, and a <tptz2:PTControlDirection> tag are associated with the <tptz1:PTZConfigurationOptions> tag.

A list of coordinate systems with which the imaging apparatus 1000 is compatible is associated with the <tptz2:Spaces> tag. These coordinate systems include information indicating the limit of a range of the coordinate systems. In the present exemplary embodiment, an <AbsolutePanTiltPositionSpace> tag and an <AbsoluteZoomPositionSpace> tag are associated with the <tptz2:Spaces> tag.

Subsequently, a <tptz2:PanTiltSpeedSpace> tag, a <tptz2:ZoomSpeedSpace> tag, and a <tptz2:PanTiltAccelerationSpace> tag are associated with the <tptz2:Spaces> tag. Also, a <tptz2:ZoomAccelerationSpace> tag is associated with the <tptz2:Spaces> tag.

A coordinate system of the absolute pan-tilt position is associated with the <AbsolutePanTiltPositionSpace> tag. In the present exemplary embodiment, a <tptz2:URI> tag, a <tptz2:XRange> tag, and a <tptz2:YRange> tag are associated with the <AbsolutePanTiltPositionSpace> tag.

The uniform resource identifier (URI) of the coordinate system is associated with the <tptz2:URI> tag. PositionGenericSpace is associated with the <tptz2:URI> tag. Thus, the <tptz2:URI> tag indicates a normalized position space. Furthermore, the range of the X axis, in other words, the range of positions in pan directions, is associated with the <tptz2:XRange> tag.

A <tptz2:Min> tag and a <tptz2:Max> tag are associated with the <tptz2:XRange> tag. "−1.000000" is associated with the <tptz2:Min> tag. Also, "1.000000" is associated with the <tptz2:Max> tag.

Thus, the <tptz2:XRange> tag indicates that the range of the X axis is limited to a range of −1.000000 to 1.000000.

Similarly, the range of the Y axis, in other words, the range of positions in tilt directions, is associated with the <tptz2:YRange> tag. A <tptz2:Min> tag and a <tptz2:Max> tag are associated with the <tptz2:YRange> tag. "−1.000000" is associated with the <tptz2:Min> tag. Also, "1.000000" is associated with the <tptz2:Max> tag.

Thus, the <tptz2:YRange> tag indicates that the range of the Y axis is limited to a range of −1.000000 to 1.000000.

A <tptz2:URI> tag and a <tptz2:XRange> are associated with the <AbsoluteZoomPositionSpace> tag. PositionGenericSpace is associated with the <tptz2:URI> tag. Thus, the <tptz2:URI> tag indicates a normalized position space.

The range of the X axis, in other words, the range of zoom positions, is associated with the <tptz2:XRange> tag. A <tptz2:Min> tag and a <tptz2:Max> tag are associated with the <tptz2:XRange> tag. "−1.000000" is associated with the <tptz2:Min> tag. Also, "1.000000" is associated with the <tptz2:Max> tag.

Thus, the <tptz2:XRange> tag indicates that the range of the X axis is limited to a range of −1.000000 to 1.000000.

A <tptz2:URI> tag and a <tptz2:XRange> are associated with the <tptz2:PanTiltSpeedSpace> tag. GenericSpeedSpace is associated with the <tptz2:URI> tag. Thus, the <tptz2:URI> tag indicates a normalized speed space.

The range of the X axis, in other words, the range of rotational speeds in panning directions and tilt directions, is associated with the <tptz2:XRange> tag. A <tptz2:Min> tag and a <tptz2:Max> tag are associated with the <tptz2:XRange> tag. "0.000000" is associated with the <tptz2:Min> tag. Also, "1.000000" is associated with the <tptz2:Max> tag.

Thus, the <tptz2:XRange> tag indicates that the range of the X axis is limited to a range of 0.000000 to 1.000000.

A <tptz2:URI> tag and a <tptz2:XRange> tag are associated with the <tptz2:ZoomSpeedSpace> tag. GenericSpeedSpace is associated with the <tptz2:URI> tag. Thus, the <tptz2:URI> tag indicates a normalized speed space.

The range of the X axis, in other words, the range of zoom speeds, is associated with the <tptz2:XRange> tag. A <tptz2:Min> tag and a <tptz2:Max> tag are associated with the <tptz2:XRange> tag. "0.000000" is associated with the <tptz2:Min> tag. Also, "1.000000" is associated with the <tptz2:Max> tag.

Thus, the <tptz2:XRange> tag indicates that the range of the X axis is limited to a range of 0.000000 to 1.000000.

A <tptz2:URI> tag and a <tptz2:XRange> tag are associated with the <tptz2:PanTiltAccelerationSpace> tag. GenericAccelerationSpace is associated with the <tptz2:URI> tag. Thus, the <tptz2:URI> tag indicates a normalized acceleration space.

The range of the X axis, in other words, the range of accelerations of rotation in pan directions and tilt directions, is associated with the <tptz2:XRange> tag. A <tptz2:Min> tag and a <tptz2:Max> tag are associated with the <tptz2:XRange> tag. "0.000000" is associated with the <tptz2:Min> tag. Also, "1.000000" is associated with the <tptz2:Max> tag.

Thus, the <tptz2:XRange> tag indicates that the range of the X axis is limited to a range of 0.000000 to 1.000000.

A <tptz2:URI> tag and a <tptz2:XRange> tag are associated with the <tptz2:ZoomAccelerationSpace> tag. GenericAccelerationSpace is associated with the <tptz2:URI> tag. Thus, the <tptz2:URI> tag indicates a normalized acceleration space.

The range of the X axis, in other words, the range of accelerations of zoom, is associated with the <tptz2:XRange> tag. A <tptz2:Min> tag and a <tptz2:Max> tag are associated with the <tptz2:XRange> tag. "0.000000" is associated with the <tptz2:Min> tag. Also, "1.000000" is associated with the <tptz2:Max> tag.

Thus, the <tptz2:XRange> tag indicates that the range of the X axis is limited to a range of 0.000000 to 1.000000.

The range of time-out periods in a case where the imaging apparatus 1000 is compatible with continuous pan-tilt-zoom driving is associated with the <tptz2:PTZTimeout> tag. When the time-out period has elapsed, the continuous pan-tilt-zoom driving stops. A <tptz2:Min> tag and a <tptz2:Max> tag are associated with the <tptz2:PTZTimeout> tag. "PT1S" is associated with the <tptz2:Min> tag. "PT04M32S" is associated with the <tptz2:Max> tag. Thus, the range of time-out periods in the present exemplary embodiment is limited to a range of 1 second to 4 minutes and 32 seconds.

Information about pan-tilt control directions of the imaging apparatus 1000 is associated with a <tptz2:PTControlDirection> tag. A <tptz2:Reverse> tag is associated with the <tptz2:PTControlDirection> tag. The <tptz2:Reverse> tag indicates whether to reverse the pan-tilt control direction.

Two <tptz2:Mode> tags are associated with the <tptz2:Reverse> tag. "OFF" is associated with the first <tptz2:Mode> tag. "ON" is associated with the second <tptz2:Mode> tag.

This indicates that, in the SetConfiguration request, "OFF" or "ON" is associated with a <tptz2:Mode> tag associated with the <tptz2:Reverse> tag. The first <tptz2:Mode> tag indicates that the pan-tilt control direction is not to be reversed. The second <tptz2:Mode> tag indicates that the pan-tilt control direction is to be reversed.

FIG. 12 illustrates an example of the SetConfiguration request. The SetConfiguration request illustrated in FIG. 12 includes a <SetConfiguration> tag. The <SetConfiguration> tag includes a <PTZConfiguration> tag.

A <Name> tag, a <UseCount> tag, a <NodeToken> tag, and a <DefaultAbsolutePanTiltPositionSpace> tag are associated with the <PTZConfiguration> tag. Also, a <DefaultAbsoluteZoomPositionSpace> tag is associated with the <PTZConfiguration> tag.

Furthermore, a <DefaultRelativePanTiltTranslationSpace> tag and a <DefaultRelativeZoomTranslationSpace> tag are associated with the <PTZConfiguration> tag. Also, a <DefaultContinuousPanTiltVelocitySpace> tag is associated with the <PTZConfiguration> tag.

Moreover, a <DefaultPTZSpeed> tag, a <DefaultPTZAcceleration> tag, a <DefaultPTZTimeout> tag, and an <Extension> tag are associated with the <PTZConfiguration> tag.

In the present exemplary embodiment, "ptz" is associated with the <Name> tag. "ptz" is a name assigned by the user. "1" is associated with the <UseCount> tag. The value associated with the <UseCount> tag indicates the number of MediaProfiles correlated with the <PTZConfiguration> tag.

Thus, the <PTZConfiguration> tag in the present exemplary embodiment is correlated with one MediaProfile. MediaProfile is information indicating the format of video (coding method or the like) which the imaging apparatus 1000 is capable of transmitting.

An identifier for identifying PTZNode is associated with a <NodeToken> tag. "0" is associated with the <NodeToken> tag in the present exemplary embodiment. PTZNode is information indicating the range of movement of each of, for example, the pan driving mechanism 1101, the tilt driving mechanism 1102, and the zoom mechanism 1103.

A default absolute pan-tilt position space in a case where the imaging apparatus 1000 is compatible with absolute pan-tilt driving is associated with the <DefaultAbsolutePanTiltPositionSpace> tag. PositionGenericSpace is associated with the <DefaultAbsolutePanTiltPositionSpace> tag in the present exemplary embodiment.

Thus, in the present exemplary embodiment, the default absolute pan-tilt position space is a normalized position space.

A default absolute zoom position space in a case where the imaging apparatus 1000 is compatible with absolute zoom driving is associated with the <DefaultAbsoluteZoomPositionSpace> tag. PositionGenericSpace is associated with the <DefaultAbsoluteZoomPositionSpace> tag in the present exemplary embodiment.

Thus, in the present exemplary embodiment, the default absolute zoom position space is a normalized position space.

A default relative pan-tilt movement space in a case where the imaging apparatus 1000 is compatible with relative pan-tilt driving is associated with the <DefaultRelativePanTiltTranslationSpace> tag. TranslationGenericSpace is associated with the <DefaultRelativePanTiltTranslationSpace> tag in the present exemplary embodiment.

Thus, in the present exemplary embodiment, the default relative pan-tilt movement space is a normalized movement space.

A default relative zoom movement space in a case where the imaging apparatus 1000 is compatible with relative zoom driving is associated with the <DefaultRelativePZoomTranslationSpace> tag. TranslationGenericSpace is associated with the <DefaultRelativeZoomTranslationSpace> tag in the present exemplary embodiment.

Thus, in the present exemplary embodiment, the default relative zoom movement space is a normalized movement space.

A default continuous pan-tilt speed space in a case where the imaging apparatus 1000 is compatible with continuous pan-tilt driving is associated with the <DefaultContinuousPanTiltVelocitySpace> tag. VelocityGenericSpace is associated with the <DefaultContinuousPanTiltVelocitySpace> tag in the present exemplary embodiment.

Thus, in the present exemplary embodiment, the default continuous pan-tilt speed space is a normalized speed space.

A default continuous zoom speed space in a case where the imaging apparatus 1000 is compatible with continuous zoom driving is associated with the <DefaultContinuousZoomVelocitySpace> tag. VelocityGenericSpace is associated with the <DefaultContinuousZoomVelocitySpace> tag in the present exemplary embodiment.

Thus, in the present exemplary embodiment, the default continuous zoom speed space is a normalized speed space.

A default pan-tilt-zoom speed in a case where the imaging apparatus 1000 is compatible with absolute pan-tilt-zoom driving or relative pan-tilt-zoom driving is associated with the <DefaultPTZSpeed> tag. In the normalized speed space, "1" as a default pan speed, "1" as a default tilt speed, and "1" as a default zoom speed are associated with the <DefaultPTZSpeed> tag in the present exemplary embodiment.

A default pan-tilt-zoom acceleration in a case where the imaging apparatus 1000 is compatible with absolute pan-tiltzoom driving or relative pan-tilt-zoom driving is associated with the <DefaultPTZAcceleration> tag.

In the normalized acceleration space, "1" as a default pan acceleration, "1" as a default tilt acceleration, and "1" as a default zoom acceleration are associated with the <DefaultPTZAcceleration> tag in the present exemplary embodiment.

A default time-out period in a case where the imaging apparatus 1000 is compatible with continuous pan-tilt-zoom driving is associated with the <DefaultPTZTimeout> tag. When the time-out period has elapsed, the continuous pan-tilt-zoom driving stops. In the present exemplary embodiment, "PT8S" is associated with the <DefaultPTZTimeout> tag.

Thus, the imaging apparatus 1000 according to the present exemplary embodiment stops continuous pan-tilt-zoom driving eight seconds after starting the continuous pan-tilt-zoom driving.

A <PTControlDirection> tag is associated with the <Extension> tag usable for extension. A <Reverse> tag is associated with the <PTControlDirection> tag. A <Mode> tag is associated with the <Reverse> tag. Content "OFF" is associated with the <Mode> tag.

Content "false" is associated with the <ForcePersistence> tag.

FIG. 13 illustrates an example of the SetConfiguration response. The SetConfiguration response illustrated in FIG. 13 includes a <tptz1:SetConfigurationResponse> tag.

A <tptz1:SetConfigurationResponse> tag with which no value is associated as illustrated in FIG. 13 indicates that the imaging apparatus 1000 has succeeded in processing the SetConfiguration request transmitted from the client 3000.

On the other hand, a <tptz1:SetConfigurationResponse> tag with which a value indicative of an error is associated indicates that the imaging apparatus 1000 has failed in processing the SetConfiguration request transmitted from the client 3000.

In the present exemplary embodiment, an "AbsoluteMove request" is used as an instruction to change the shooting direction and the angle of field of the imaging apparatus 1000, but this is not restrictive. For example, a "GotoHomePosition request" may be used as such an instruction. The "GotoHomePosition request" is an instruction to change the shooting direction and the angle of field of the imaging apparatus 1000 to a home position (a pre-registered position).

Furthermore, in the present exemplary embodiment, the control unit 1001 is configured to obtain an acceleration at which to change the shooting direction and the angle of field of the imaging apparatus 1000 in the following way. More specifically, the control unit 1001 reads out, from the memory 1002, an acceleration corresponding to, in the table illustrated in FIG. 9, the acceleration associated with the <DefaultPTZAcceleration> tag included in the "SetConfiguration request". However, this configuration is not restrictive.

For example, the control unit 1001 may be configured to obtain an acceleration at which to change the shooting direction and the angle of field of the imaging apparatus 1000 in the following way. More specifically, the control unit 1001 obtains the acceleration by adding a predetermined value previously stored in the memory 1002 to the acceleration associated with the <DefaultPTZAcceleration> tag included in the "SetConfiguration request".

A second exemplary embodiment is next described with respect to a case where the imaging apparatus 1000 is instructed to cause the imaging unit 1003 to make a tour of a plurality of shooting positions, called a preset tour. The shooting positions in the present exemplary embodiment correspond to positions of the imaging unit 1003 in pan directions, positions of the imaging unit 1003 in tilt directions, and angles of field of the imaging apparatus 1000. In the present exemplary embodiment, elements similar to those of the above-described exemplary embodiment are denoted by the respective same reference numerals, and the description thereof is, therefore, not repeated.

Figure 5:
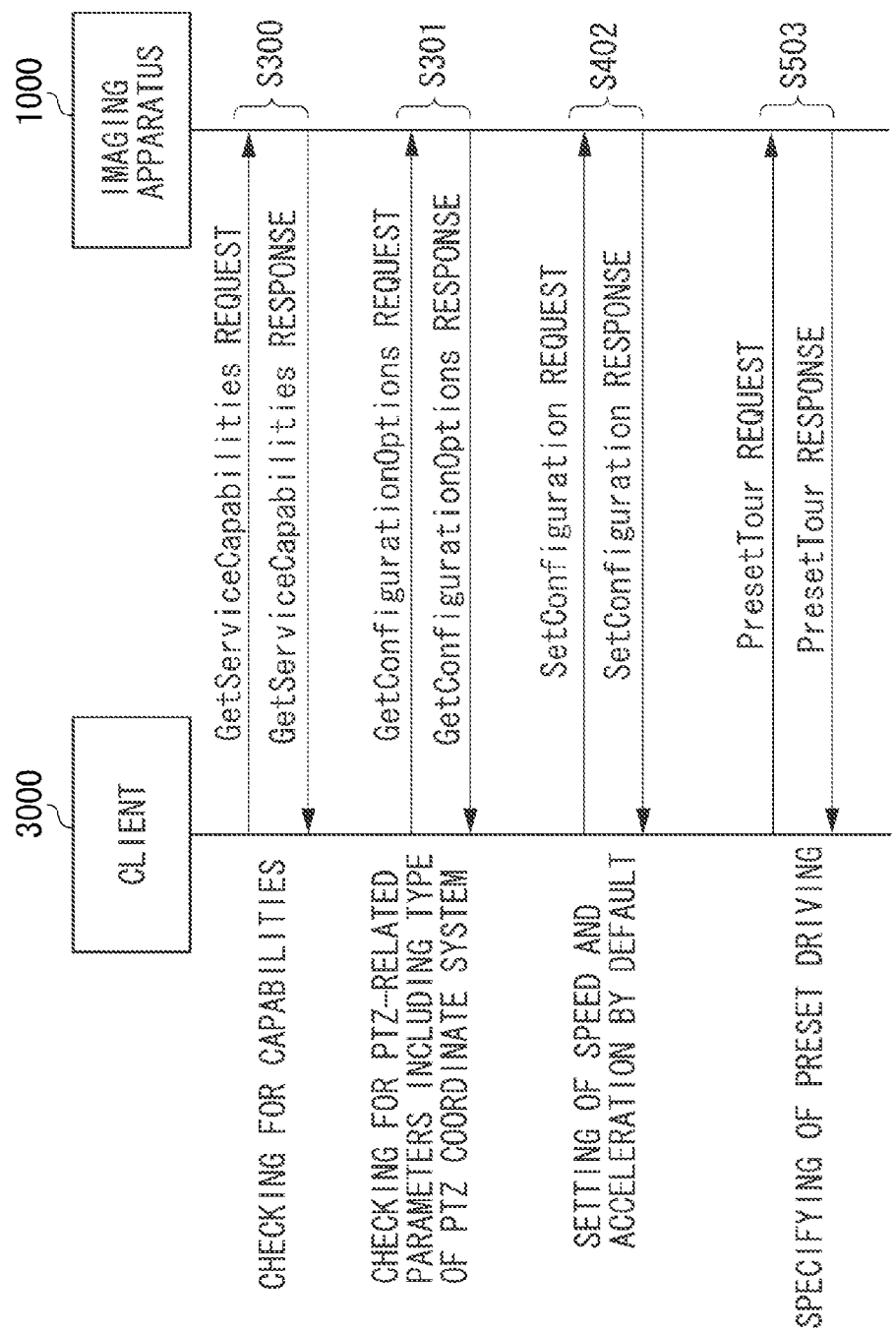
FIG. 5 illustrates a control command sequence of an imaging system according to a second exemplary embodiment.

FIG. 5 illustrates a command sequence between the client 3000 and the imaging apparatus 1000 used to cause the imaging unit 1003 to make the preset tour by specifying the "speed" at which to change the shooting direction and the angle of field of the imaging apparatus 1000 and the "acceleration" at which to change the shooting direction and the angle of field of the imaging apparatus 1000.

Since step S300 illustrated in FIG. 5 is similar to step S300 illustrated in FIG. 3, the description thereof is not repeated. Also, since step S301 illustrated in FIG. 5 is similar to step S301 illustrated in FIG. 3, the description thereof is not repeated. Moreover, since step S402 illustrated in FIG. 5 is similar to step S402 illustrated in FIG. 4, the description thereof is not repeated.

In step S503, the control unit 3001 instructs the communication unit 3004 to transmit a "PresetTour request" to the imaging apparatus 1000. The "PresetTour request" is a command to instruct the imaging apparatus 1000 to cause the imaging unit 1003 to make a tour of a plurality of shooting positions in a predetermined sequence.

The "PresetTour request" includes a <PTZSpeed> tag. The "speed" at which to change the shooting direction and the angle of field of the imaging apparatus 1000 is associated with the <PTZSpeed> tag, so that the "speed" can be specified to the imaging apparatus 1000.

Furthermore, the "PresetTour request" includes an <Extension> tag. The "acceleration" at which to change the shooting direction and the angle of field of the imaging apparatus 1000 is associated with the <Extension> tag, so that the "acceleration" can be specified to the imaging apparatus 1000.

According to such a specifying method, the "PresetTour request" allows compatibility between a model capable of specifying the "acceleration" at which to change the shooting direction and the angle of field of the imaging apparatus 1000 and a model incapable of specifying the "acceleration".

The imaging apparatus 1000, having received the "PresetTour request", causes the imaging unit 1003 to make a tour of a plurality of shooting positions. In this case, the imaging apparatus 1000 changes the shooting direction and the angle of field of the imaging apparatus 1000 at the speed and the acceleration specified with the "PresetTour request".

However, in a case where no acceleration is specified with the "PresetTour request", the imaging apparatus 1000 changes the shooting direction and the angle of field of the imaging apparatus 1000 at the acceleration specified with the "SetConfiguration request".

Furthermore, in a case where no acceleration is specified with the "PresetTour request" and the "SetConfiguration request", the imaging apparatus 1000 changes the shooting direction and the angle of field of the imaging apparatus 1000 at the default acceleration.

In addition, a case may be supposed where the "GetConfigurationOptions response" does not include a <tptz2:PanTiltAccelerationSpace> tag. In the case of such a supposition, the imaging apparatus 1000, having received the "PresetTour request" in step S503, changes the shooting direction of the imaging apparatus 1000 at a specific acceleration. The same applies to changing of the angle of field of the imaging apparatus 1000.

Embodiments of the present application can also be realized by a computer of a system or apparatus that reads out and executes computer executable instructions recorded on a storage medium (e.g., non-transitory computer-readable storage medium) to perform the functions of one or more of the above-described embodiment(s) of the present application, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the claimed subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-151173 filed Jul. 20, 2013, which is hereby incorporated by reference herein in its entirety.

What is claimed is:

1. An imaging apparatus comprising:
an imaging unit configured to capture an object image;
a rotation unit configured to rotate the imaging unit in a predetermined direction;
a first transmission unit configured to transmit, to an external apparatus, acceleration information indicating whether an acceleration at which the rotation unit rotates the imaging unit is able to be designated;
a receiving unit configured to receive, from the external apparatus, a control instruction which comprises information designating an acceleration for controlling the rotation unit;
a control unit configured to control the rotation unit based on the control instruction received by the receiving unit; and
a second transmission unit configured to transmit, to the external apparatus, specification information associated with the control instruction acceptable by the control unit.

2. The imaging apparatus according to claim 1, wherein the acceleration information further comprises information indicating whether the acceleration is able to be designated in at least one of a case where the rotation unit starts rotating the imaging unit, and a case where the rotation unit stops rotating the imaging unit.

3. The imaging apparatus according to claim 1, wherein the specification information transmitted by the second transmission unit further comprises information indicating whether a speed and an acceleration at which the rotation unit rotates the imaging unit are able to be separately designated.

4. The imaging apparatus according to claim 1, further comprising a transform unit configured to transform the information designating the acceleration included in the control instruction to acceleration control data for controlling the rotation unit.

5. The imaging apparatus according to claim 1, further comprising a storing unit configured to store a default acceleration for controlling the rotation unit, wherein the specification information further comprises default acceleration information.

6. The imaging apparatus according to claim 5, further comprising a computing unit configured to compute the acceleration for controlling the rotation unit from the default acceleration and the information designating the acceleration included in the control instruction.

7. An external apparatus capable of communicating with an imaging apparatus including an imaging unit configured to capture an object image and a rotation unit configured to rotate the imaging unit in a predetermined direction, the external apparatus comprising:
an acquisition unit configured to acquire, from the imaging apparatus, acceleration information indicating whether an acceleration at which the rotation unit rotates the imaging unit is able to be designated; and
a changing unit configured to change contents to be displayed on a display unit, in accordance with the acceleration information received from the imaging apparatus.

8. A method for controlling an imaging apparatus comprising an imaging unit configured to capture an object image and a rotation unit configured to rotate the imaging unit in a predetermined direction, the method comprising:
transmitting, to an external apparatus, acceleration information indicating whether an acceleration at which the rotation unit rotates the imaging unit is able to be designated;
receiving, from the external apparatus, a control instruction which comprises information designating an acceleration for controlling the rotation unit;
controlling the rotation unit based on the control instruction; and
transmitting, to the external apparatus, specification information associated with the control instruction acceptable.

9. A method for controlling an imaging apparatus according to claim 8, wherein the acceleration information further comprises information indicating whether the acceleration is able to be designated in at least one of a case where the rotation unit starts rotating the imaging unit, and a case where the rotation unit stops rotating the imaging unit.

10. A method for controlling an imaging apparatus according to claim 8, wherein the specification information transmitted further comprises information indicating whether a speed and an acceleration at which the rotation unit rotates the imaging unit are able to be separately designated.

11. A method for controlling an imaging apparatus according to claim 8, further comprising transforming the information designating the acceleration included in the control instruction to acceleration control data for controlling the rotation unit.

12. A method for controlling an imaging apparatus according to claim 8, further comprising storing a default acceleration for controlling the rotation unit,
wherein the specification information further comprises default acceleration information.

13. A method for controlling an imaging apparatus according to claim 12, further comprising computing the acceleration for controlling the rotation unit from the default acceleration and the information designating the acceleration included in the control instruction.

14. A method for controlling an external apparatus comprising a display unit to display contents and capable of communicating with an imaging apparatus including an imaging unit configured to capture an object image and a rotation unit configured to rotate the imaging unit in a predetermined direction, the external apparatus comprising:
   acquiring, from the imaging apparatus, acceleration information indicating whether an acceleration at which the rotation unit rotates the imaging unit is able to be designated; and
   changing the contents to be displayed on the display unit, in accordance with the acceleration information received from the imaging apparatus.

15. A non-transitory computer-readable storage medium storing computer-executable process steps, the computer-executable process steps causing a computer to execute the method according to claim 8.

16. A non-transitory computer-readable storage medium storing computer-executable process steps, the computer-executable process steps causing a computer to execute the method according to claim 14.

* * * * *